No. 839,448.                                                          PATENTED DEC. 25, 1906.

J. ASCHENBRENNER.
ANIMAL TRAP.
APPLICATION FILED JAN. 15, 1906.

Fig. 1.

Fig. 2.

Witnesses:
E. F. Wilson
R. A. Fischer

Inventor
Joseph Aschenbrenner
By Rudolph Wm. Lotz, Atty.

UNITED STATES PATENT OFFICE.

JOSEPH ASCHENBRENNER, OF CHICAGO, ILLINOIS.

ANIMAL-TRAP.

No. 839,448.

Specification of Letters Patent.

Patented Dec. 25, 1906.

Application filed January 15, 1906. Serial No. 296,108.

*To all whom it may concern:*

Be it known that I, JOSEPH ASCHENBRENNER, a citizen of the United States, residing at Chicago, in the county of Cook and State of Illinois, have invented certain new and useful Improvements in Animal-Traps; and I do hereby declare the following to be a full, clear, and exact description of the invention, such as will enable others skilled in the art to which it appertains to make and use the same.

My invention relates to a novel construction in a rat-trap, the object being to provide a device of this character in which a relatively unlimited number of rats or other animals may be caught alive without bodily injury; and it consists in the features of construction and combinations of parts hereinafter fully described and claimed.

In the accompanying drawings, illustrating my invention, Figure 1 is a vertical longitudinal section of a rat-trap constructed in accordance with my invention. Fig. 2 is a vertical transverse section of the same on the line 2 2 of Fig. 1.

My said trap comprises a receptacle A, which is relatively long, narrow, and deep, of rectangular form, and made, preferably, of sheet metal, said receptacle being provided at one side adjacent the bottom thereof with a gate B, hinged on its lower edge thereto and adapted to be locked in its closed position by means of a suitable latch C. Opposite said gate the opposite wall of said receptacle A is partially foraminated, preferably by cutting a longitudinal slot therein which is covered with a strip of wire-cloth D. Disposed in the upper end of said receptacle A are two cross-rods E, secured at their ends to the side walls thereof adjacent the end walls, and on each of said cross-rods E a flat plate F is pivotally mounted between its ends, the length of each of said plates being relatively a trifle longer than one-half the length of said receptacle A and being relatively so disposed that their inner ends almost meet. Said inner ends being of greater length than the outer end portions of said plates, the latter are counterweighted by means of the blocks G, of any suitable material, secured thereto. The said outer ends project slightly beyond the end walls of said receptacle A and rest upon the latter. Pivotally mounted between their ends on said rods E are bell-crank levers H, one arm of each of which carries a weight I at its free end, the other arm thereof being disposed in the path of the lower end of each of said plates F and adapted when the latter is swung downwardly by the weight of an animal to impart to said plate initial reverse movement, which is completed by the action of the counterweights G. The said levers H are preferably made of wire, which is coiled at the elbow portions of said levers to form spiral springs which will be compressed by the pressure exerted on the free ends of the arms of said levers when said weights I strike the end walls of said receptacle. On each of the end walls of said receptacle A, adjacent the upper ends thereof, are loops J, of wire or the like, which are adapted to be engaged by hooks K on the upper ends of inclined runways L to support the latter, said runways serving to enable animals to be trapped to ascend upon said plates F. On the upper ends of the side walls of said receptacle A are flaring flanges M, and secured at its ends to the middle upper end portions of said flanges M is a cross-bar N, from which a rod O depends, to the lower end of which bait is attached in any suitable manner, said bait being thus disposed above the extreme inner ends of said plates F. When a rat or other animal mounts said plate F and its weight falls upon the inner end portions thereof, the latter will obviously dip and precipitate such animal into said receptacle A. The latter, being made of metal, cannot be gnawed through, and its sheer smooth walls will prevent the animal caught therein from clambering to the top, and thus possibly escape.

The device is very simple and efficient.

I claim as my invention—

1. An animal-trap comprising a relatively deep, elongated receptacle open at its upper end, inclined approaches disposed at either end thereof, lateral shafts spanning the open end of said receptacle adjacent the ends thereof, platforms pivotally mounted on the said shafts between their ends, the inner ends of said platforms being of greater length than the outer ends and the latter being counterweighted and adapted to rest at their free ends upon the end walls of said receptacle, bell-crank levers pivotally disposed on the said shafts, and each having a depending arm carrying a weight, the other arms of said levers being disposed in the paths of the longer ends of said platforms respectively and adapted to be engaged thereby to raise the weighted arms when said platforms are swung, said weighted arms being adapted to impart initial reverse movement to said platforms.

2. An animal-trap comprising a relatively deep, elongated receptacle open at its upper end, inclined approaches disposed at either end thereof, lateral shafts spanning the open end of said receptacle adjacent the ends thereof, platforms pivotally mounted on the said shafts between their ends, the inner ends of said platforms being of greater length than the outer ends and the latter being counterweighted and adapted to rest at their free ends upon the end walls of said receptacle, bell-crank levers provided at their elbows with spiral springs pivotally disposed on the said shafts and each having a depending arm carrying a weight, the other arms of said levers being disposed in the paths of the longer ends of said platforms respectively and adapted to be engaged thereby to raise the weighted arms when said platforms are swung, said weighted arms being adapted to impart initial reverse movement to said platforms.

In testimony whereof I have signed my name in presence of two subscribing witnesses.

JOSEPH ASCHENBRENNER.

Witnesses:
 RUDOLPH WM. LOTZ,
 ARTHUR A. LOTZ.